United States Patent [19]

Sillett

[11] Patent Number: 5,005,472

[45] Date of Patent: Apr. 9, 1991

[54] ASEPTIC PROCESSING SYSTEM

[75] Inventor: Christopher Sillett, Horsham, United Kingdom

[73] Assignee: APV UK Limited, United Kingdom

[21] Appl. No.: 346,072

[22] Filed: May 2, 1989

[30] Foreign Application Priority Data

May 4, 1988 [GB] United Kingdom ................. 8810496

[51] Int. Cl.[5] ................................ A01J 11/00

[52] U.S. Cl. ................................ 99/468; 99/475; 99/477; 99/646 C; 134/171; 366/106; 366/107; 426/399; 426/519

[58] Field of Search ............... 366/101, 106, 107, 132, 366/139, 341; 99/348, 475, 474, 472, 467, 468, 470, 477, 646 C, 646 S, 516, 323.1; 426/519, 418, 399; 137/571; 134/166 R, 169 R, 171

[56] References Cited

U.S. PATENT DOCUMENTS

| | | | |
|---|---|---|---|
| 1,103,920 | 7/1914 | Walker, Jr. | 99/646 C X |
| 2,692,608 | 10/1954 | Clearman | 137/571 X |
| 3,031,148 | 4/1962 | Holdren | 134/166 R X |
| 3,379,208 | 4/1968 | Alleaume | 137/571 X |
| 3,450,389 | 6/1969 | McCurdy | 366/106 |
| 4,287,821 | 9/1981 | Ukai et al. | 99/646 C |
| 4,325,296 | 4/1982 | Ukai et al. | 99/516 X |
| 4,463,935 | 8/1984 | Yonekawa . | |
| 4,788,075 | 11/1988 | Joseph et al. | 426/399 X |
| 4,792,235 | 12/1988 | Paul | 366/107 |

FOREIGN PATENT DOCUMENTS

| | | |
|---|---|---|
| 2854557 | 9/1980 | Fed. Rep. of Germany . |
| 1168423 | 10/1969 | United Kingdom . |
| 1200992 | 8/1970 | United Kingdom . |

*Primary Examiner*—Harvey C. Hornsby
*Assistant Examiner*—Stephen F. Gerrity
*Attorney, Agent, or Firm*—Thomas E. Sisson

[57] ABSTRACT

An aseptic storage tank includes a draught tube into which food product enters in use. By increasing and decreasing relative pressure in the headspace of the tube the contents in the tube are forced into and out of the tank to keep the food product therein in motion.

8 Claims, 1 Drawing Sheet

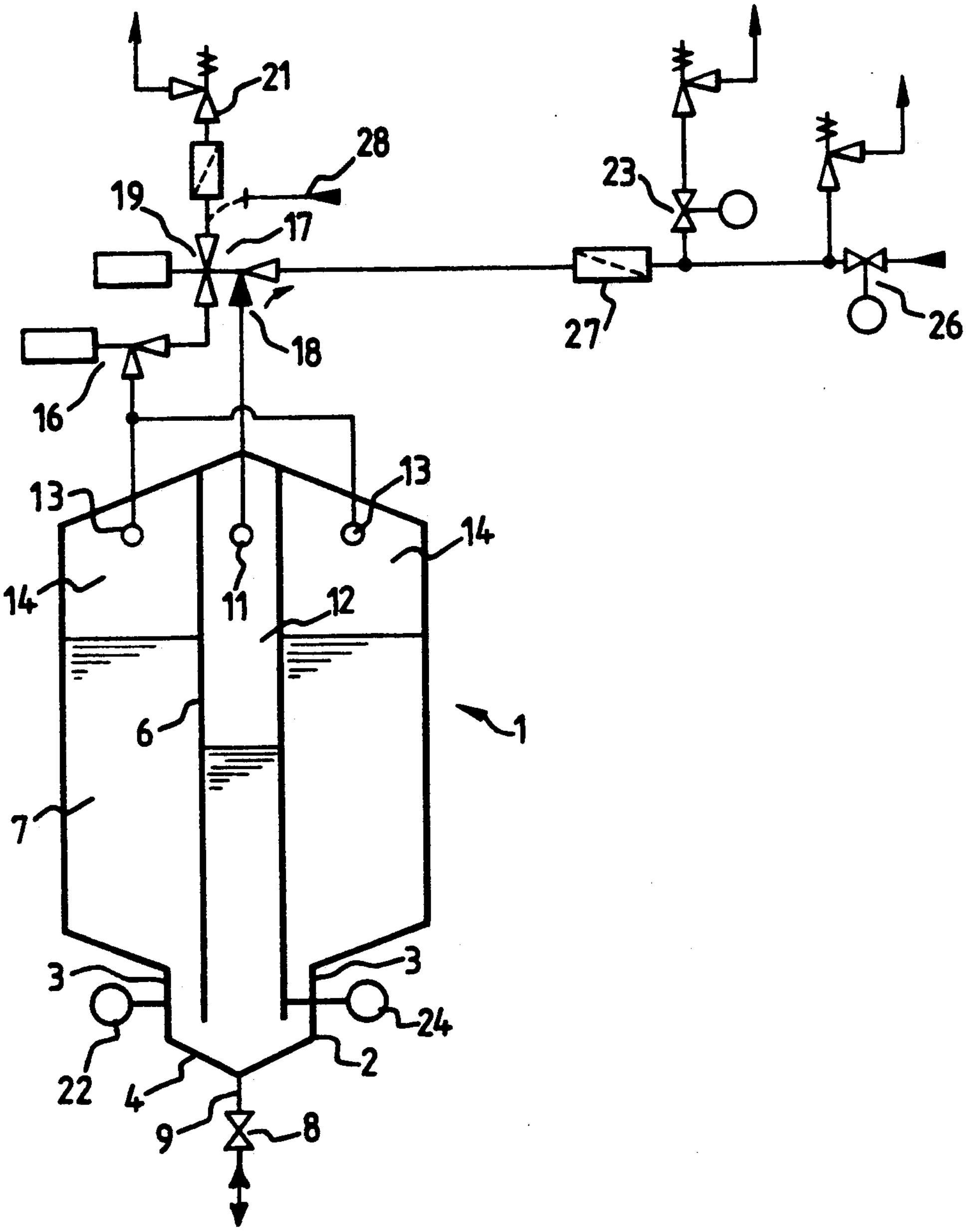
21
28
19
17
23
18
27
26
16
13
13
14
14
11
12
6
1
7
3
3
24
22
4
2
9
8

ASEPTIC PROCESSING SYSTEM

BACKGROUND OF THE INVENTION

This invention relates to aseptic processing systems and particularly to storage vessels.

In aseptic food processing it is necessary for viscous food products and in particular food products containing particulate matter to be maintained in homogeneous suspension especially before filling and packaging, and also before the food product is sterilized.

The food product, before filling, is conveniently stored in a vessel such as an aseptic tank. The food product is usually maintained in homogeneous suspension within an aseptic tank by mechanical agitation. This has the disadvantage that the mechanical agitation can damage the particulate matter which may thereby lose its integrity. Mechanical agitators are also inconvenient to clean. It is desirable to provide a relatively simple system and method of maintaining the food product in a storage vessel in homogeneous suspension, without damaging the food product.

SUMMARY OF THE INVENTION

According to the present invention there is provided a storage vessel including an auxiliary enclosure in communication with the vessel so that in use contents in the vessel enter the bottom of the enclosure and means for increasing and decreasing the relative pressure in a headspace of the enclosure beyond the contents, so as to move the contents towards and away from the enclosure, away from and towards the vessel respectively, and so keep at least most of the contents in the vessel in motion.

The auxiliary enclosure may be disposed within the vessel, the auxiliary enclosure having a bottom opening located close to the base of the vessel for communication with the contents of the vessel.

The auxiliary enclosure preferably provides a "draught tube" which is sealed at one end to the top of the storage vessel with its other opened end located close to the base of the storage vessel.

The draught tube is preferably located centrally within a cylindrically-shaped storage vessel. The base of the storage vessel preferably has a cup-shaped bottom of radius smaller than that of the storage vessel, with the draught tube extending into the space provided by the cup-shaped bottom. Food product is preferably introduced into and extracted from the storage vessel through the bottom of the storage vessel.

The relative pressure in the headspace of the storage vessel may be altered by introducing or extracting sterilized gas into the storage vessel through apertures within the headspace in the form of sprayballs.

According to a second aspect of the present invention there is provided an aseptic processing system comprising a storage vessel with the auxiliary enclosure.

BRIEF DESCRIPTION OF THE DRAWING

FIG. 1 is a schematic illustration of the aseptic process system of the present invention.

DETAILED DESCRIPTION OF THE PREFERRED EMBODIMENT

A storage vessel according to the invention will now be described, by way of example, with reference to the accompanying drawing which shows a schematic form of the storage vessel.

Referring to the drawing the storage vessel comprises a cylindrically-shaped aseptic tank 1 having a base 2 which slopes downwards towards the central axis of the tank 1 until it reaches a downwardly extending vertical step 3 and then it continues from the bottom of step 12 on the same slope as before to the central axis, so that a cup-shaped bottom 4 is formed within the tank 1.

An auxiliary enclosure in the form of a draught tube 6, which is sealed to the top of the tank 1, has an open end close to the base of the tank 1 which extends into the cup-shaped bottom 4. Food product 7 containing particulate matter is introduced into the tank 1 via valve 8 in a pipe 9 connected to the base 2 of the tank 1.

Sprayball 11 within the headspace 12 of the draught tube 6 and sprayballs 13 within the headspace 14 of the main tank 1, allow gas to be introduced into and extracted from the tank 1.

As food product 7 is introduced into the tank 1, valve 16 is opened and valve 17 is energized to connect the common port 18 to the top tee connections 19 and the air within the container is exhausted through pressure relief valve 21.

The level of the food product 7 within the tank is sensed using level transmitter 22. The pressure within the headspace 12 and 14 are maintained at this stage at approximately four times atmospheric pressure. When the tank is filled to approximately two thirds of its capacity valve 19 is released and valve 23 is opened so that the pressure in the headspace 12 of the draught tube 6 reduces to typically three times atmospheric pressure. This causes the food product 7 to move up within the draught tube 6 to balance the pressures within the headspaces 12 and 14 of the tank 1. The level of the food product 7 within the draught tube 6 is sensed using level transmitter 24 and when the food product reaches its highest level, just below the sprayball 13, the valve 23 is closed. At this point valve 26 is opened causing air pressurized at five times atmospheric pressure to pass through a sterilizing filter 27 into the headspace 12. As the pressure within the headspace 12 rises the food product 7 is forced downwards within the draught tube 6, and into the outer compartment of the tank 1. The level of the food product 7 within the draught tube 6 is again sensed and when it reaches its lowest level, valve 26 is closed and valve 23 is opened, and the cycle is repeated.

By increasing and decreasing the pressure within the headspace 12 of the draught tube the food product 7 is kept in motion so that it tends to be maintained in homogeneous suspension.

The food product 7 is extracted from the tank 1 again via valve 8, and when it reaches a certain lower level the pressure within the tank 1 is stabilized.

The cup-shaped bottom 4 of the tank 1 causes the particulate matter within the food product 7 to mix thoroughly throughout the food product 7 by forcing it up into the bulk of the food product 7 when the pressure in the headspace 12 is increased.

In order to clean the tank 1 cleaning fluid 28 is introduced into the system above valve 19 and forced through the sprayballs 11 and 13 to clean the inner walls of the tank 1 and the walls of the draught tube 6.

The mixing rate of the food product 7 can be adjusted by varying the setting of pressure relief valves 27 and 28 to either increase the rate of rise and fall of the food product 7 or to decrease its rate.

By means of the described embodiment a storage vessel is provided which is particularly useful in aseptic processing systems. There is no drive shaft to a mechanical agitator which must be kept sterile, and furthermore no shadows caused by blades on a mechanical agitator exist which complicate the cleaning of such storage vessels. In particular, the particulate matter within a food product is not damaged while being maintained in homogeneous suspension.

It will be appreciated that the draught tube or auxiliary enclosure is not limited to being located within the storage vessel since it may be mounted outside the storage vessel and be of any suitable shape and configuration.

I claim:

1. A storage vessel for aseptic processing of a food product, said vessel comprising an aseptic tank, a draught tube enclosed within said tank and sealed at a first end to an upper end of said tank, said draught tube being open at a second end which is located close to a bottom of said tank, means for introducing and extracting said food product into and out of said tank, and means for adjusting the relative pressure in a head space above said food product in said draught tube and a head space above said food product in said tank outside of said draught tube, said relative pressure adjusting means comprising spray balls positioned respectively in said head space, said spray balls being connected to a supply of sterilized gas and control valves being provided for controlling supply and exhaust of said gas to and from said head spaces, and said spray balls being further connected to a supply of cleaning fluid to clean said tank and said draught tube.

2. A storage vessel according to claim 1 wherein an aperture is provided at said bottom of said tank for said inlet and outlet of said food product.

3. A storage vessel according to claim 1 wherein said tank has a cup-shaped bottom of radius smaller than that of said tank, and said second end of said draught tube extends into said cup-shaped bottom.

4. A storage vessel according to claim 3 wherein a means for sensing a level of said food product in said tank outside said draught tube is provided on a wall of said cup-shaped bottom to activate said relative pressure adjusting means.

5. A storage vessel according to claim 4 wherein a means for sensing a level of said food product in said draught tube is provided at said second end of said draught tube to activate said relative pressure adjusting means.

6. In an aseptic food processing system, an aseptic storage vessel having an auxiliary enclosure in communication with said vessel so that in use contents in said vessel enter the bottom of said enclosure, and means for increasing and decreasing the relative pressure in a head space of said enclosure above said contents so as to move said contents into and out of said enclosure and so to keep at least most of said contents in said vessel in motion, wherein said means for increasing and decreasing said relative pressure comprises: spray balls located respectively in said head space of said enclosure and in a head space of said vessel above said contents in said vessel, said spray balls being connected to a source of sterilized gas for increasing said pressure in a respective head space, and wherein said spray balls are connected with a source of cleaning fluid for introducing cleaning fluid into said tank and said auxiliary enclosure through said spray balls to clean said tank and said auxiliary enclosure.

7. A storage vessel for aseptic processing of food contents, said vessel comprising an aseptic tank, an auxiliary enclosure disposed within said tank, said tank being cylindrical and said draught tube is located centrally within said tank, said auxiliary enclosure being in the form of a draught tube sealed at a first end to a top of said tank and having a second end open and located close to a base of said tank, said base of said tank sloping downwardly towards the central axis of said tank to a downwardly extending vertical step portion and further continuing from the bottom of said step to slope downwardly to said central axis resulting in a cup-shaped bottom of lateral dimensions smaller than overall lateral dimensions of said tank and said second end of said draught tube extending into said cup-shaped bottom, an aperture in said bottom of said tank for introducing and extracting said food contents into and from said aseptic tank, spray balls mounted respectively in said head space of said draught tube and a head space of said vessel above said contents in said vessel means being provided for introducing and extracting sterilized gas into and out of said storage vessel through said spray balls, and means for increasing and decreasing the relative pressure in a head space of said draught tube above contents in said vessel draught tube so as to move said contents into and out of said draught tube and so keep at least most of said contents in said vessel in motion.

8. A storage vessel according to claim 7 wherein a means is provided for introducing cleaning fluid into said storage vessel through said spray balls.

* * * * *